United States Patent [19]
Rofe

[11] Patent Number: 5,638,202
[45] Date of Patent: Jun. 10, 1997

[54] LIQUID CRYSTAL WINDSHIELD DISPLAY

[76] Inventor: Michael E. Rofe, 2781 Acorn Rd., Bloomfield Hills, Mich. 48302

[21] Appl. No.: 629,912

[22] Filed: Apr. 10, 1996

Related U.S. Application Data

[63] Continuation of Ser. No. 258,539, Jun. 10, 1994, abandoned.

[51] Int. Cl.$^6$ .................... G02F 1/1335; G02F 1/1333
[52] U.S. Cl. .................... 349/11; 349/58; 349/96
[58] Field of Search .................... 359/83, 63

[56] References Cited

U.S. PATENT DOCUMENTS

| | | | |
|---|---|---|---|
| 4,190,832 | 2/1980 | Mohler | 359/70 |
| 4,371,934 | 2/1983 | Wahl et al. | 364/424 |
| 4,641,922 | 2/1987 | Jacob | 359/86 |
| 4,806,903 | 2/1989 | Rust | 340/97 |
| 4,848,875 | 7/1989 | Baughman et al. | 359/62 |
| 5,313,292 | 5/1994 | Wood et al. | 359/13 |

*Primary Examiner*—William L. Sikes
*Assistant Examiner*—Charles Miller
*Attorney, Agent, or Firm*—Bliss McGlynn, P.C.

[57] ABSTRACT

The liquid crystal windshield display is a passive type display system utilizing an LCD, where the windshield acts as the LCD platform. Basically the same LCD technology that is currently used on many of the calculators in use. Except whereas all LCDs currently in use for calculators are reflective, the liquid crystal windshield display utilizes LCD technology in a see-through mode.

9 Claims, 3 Drawing Sheets

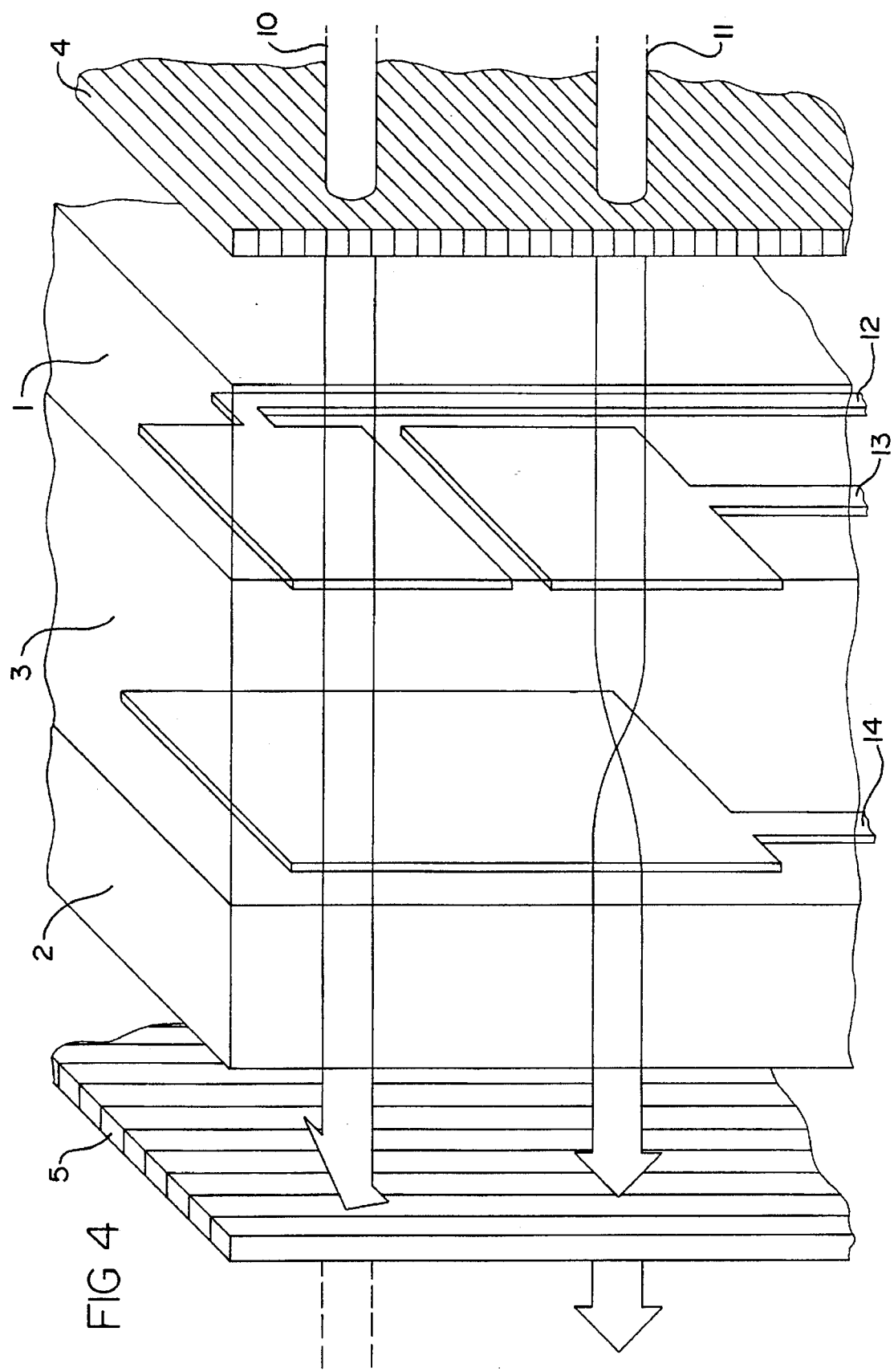

LIQUID CRYSTAL WINDSHIELD DISPLAY

This is a continuation of U.S. patent application Ser. No. 08/258,539, filed Jun. 10, 1994 now abandoned.

BACKGROUND OF THE INVENTION

1. Field of the Invention

The present invention relates generally to liquid crystal displays and, more particularly, to a liquid crystal display for a windshield of an automotive vehicle.

2. Description of the Related Art

1) Liquid-Crystal. The technology of liquid-crystal is well known and extensively utilized. Calculators primarily use liquid-crystal for their numeric displays. These are know as liquid-crystal-displays (LCD). These LCD's are produced in a variety of shapes.

Since liquid crystal molecules respond to an external applied voltage, liquid crystal can be used as an optical switch, or light valve. A common arrangement is two parallel glass plates, each with a polarizing film on its outer side. The space between the plates is filled with the liquid crystal polymer. The technical designation for the most commonly used liquid crystal type is twisted nematic (TN), and the twist refers to the tendency of the polymers to form chains that rotate from one side of the gap between the plates to the other side. This alignment can be changed with an external electric field, allowing the polarization of incoming light to be changed.

Light passing through one of the polarizers, then through the cell (the arrangement of plates, and liquid crystal), has its polarization direction rotated, following the physical rotation of the liquid crystal. When viewed, the cell is clear, or transmitting. A transparent electrical conductor is deposited on the inner surfaces of the glass plates, and patterned into a series of mutually perpendicular lines. If a voltage is placed across the cell gap by addressing the appropriate line on each side of the cell, the liquid crystal reorients to follow the applied electric filed, and the material is "untwisted". As long as the voltage is present, the passage of light will be blocked by the exit polarizer. When the voltage is turned off, the liquid crystal returns to its original state, and the pixel (defined viewing area) becomes clear again. Typical voltages and currents are quite low, which is why liquid crystal displays have been incorporated in battery-operated equipment, and in other applications where power consumption is an issue.

2) Heads-Up-Display (HUD). Originally developed for the use of the military in fighter aircraft. Now HUD has been translated to broader commercial use in automotive vehicles.

A HUD works by reflecting an image off the windshield into the drivers line of sight. The image presented to the driver is information pertaining to the vehicle's status such as speed. This allows the driver to easily determine the vehicle speed while looking out through the windshield. Thus allowing the driver to maintain their heads up position while driving instead of breaking their view of the road to determine speed. A light intensive image is necessary so that it is able to reflect off the windshield. The equipment necessary to generate the image is set below the windshield and the image generated is projected up into the windshield which in turn is reflected off the windshield and into the drivers line of vision. Sometimes special optics are used to define and focus the image so that after the image is reflected off the windshield the driver is presented with a clear and coherent image.

SUMMARY OF INVENTION

According to the present invention, the liquid crystal windshield display (LCWD) is a passive information display that uses the windshield as the actual display device. Passive in the sense that the display isn't generating the light, it simply blocks ambient light. The liquid crystal windshield display is the integration of the windshield and a LCD. So that the windshield acts as a dual purpose device, as both a device to shield the driver from wind and as the display platform.

The liquid crystal windshield display includes the following elements, two sheets of glass, a layer of liquid crystal, an annular shaped piece of plastic, two sets of transparent electrodes, two polarizing elements, and equipment to provide a voltage to the liquid crystal windshield display assembly.

The two sheets are congruent pieces of glass that when sandwiched together form the windshield. Sandwiched between these two sheets of glass is a very thin layer of liquid crystal. In addition, also sandwiched in between is a clear ring of plastic surrounding the liquid crystal to prevent the liquid crystal from moving so that its position remains static. Two sets of transparent electrodes are positioned at the inner surfaces of both sheets of glass so that electrodes are in direct contact on both sides of the liquid crystal. On the outside sheets of glass two polarizers, crossed with each other, are placed on both sides of the windshield over the region of the liquid crystal, so that any light passing through the liquid crystal will also first pass through one polarizer, the liquid crystal, and then the other polarizer. The windshield can now act as a LCD, except in a see-through mode. Whenever an electric field is applied to the liquid crystal via the transparent electrodes, this causes the region to appear dark. This by the principals of LCD. By arranging the electrodes in an ordered manner, any information can be displayed, such as can be noted by LCD presently found today.

The liquid crystal windshield display functions exactly as the LCD found on almost all calculators manufactured today. Except the glass of the windshield provides the viewing platform as the glass found in a calculator. But the glass is not functioning exactly the same because the driver is presented the information by ambient light passing through the windshield.

The purposes of the present invention are as follows:

1. Currently the HUDs (heads up displays) used in auto vehicles implement a bulky system of reflectors and a CRT (cathode-ray-tube). The liquid crystal windshield display would constitute a weight saving thus improving the gas mileage of the automotive vehicle. The weight increase would be minimal because the liquid crystal windshield display would be using the windshield as the display platform which is already present on the vehicle.

2. The liquid crystal windshield display would also use constitute a space savings in place of the old type HUD system. Allowing the designers a greater flexibility in designing the vehicle dashboard by providing room for other instrumentation or increased interior room.

3. The liquid crystal windshield display (LCWD) would use a minimal amount of current compared with the old type HUD system. Because LCDs (liquid crystal displays) require a minimal amount of current. Thus decreasing the power requirements supplied by the engine which would translate in a savings of fuel which would translate into increased gas milage. Also because of the reduced voltages there would be a corresponding reduction of EMI (Electromagnetic interference) in the environment. This reduced EMI would improve radio reception due to the reduced noise in the received signal.

4. Because the hardware for building an LCWD is less complex and extensive compared to a traditional HUD, far more vehicles could be equipped with an LCWD, whereas now a HUD would not be considered due to prohibitive cost and weight. Any vehicle that has a windshield could be built with an LCWD as an option with very little redesigning. The electronics responsible for controlling the LCD would be comparable in cost with a hand-held calculator.

5. The LCWD allows greater design flexibility than a traditional HUD. The LCWD can place information anywhere on the windshield that is desired. A traditional HUD is constrained by the placement of the equipment that reflects the information. No such constraints exist for the LCWD. In addition the LCWD can display information in two separate areas of the windshield at the same time. This is not possible with a traditional HUD. A traditional HUD can only display information in one particular region at one time.

6. The improved visibility in bright daylight. The LCWD would provide a very clear image in bright sunlight. In fact the brighter the day the better the image becomes due to the increased contrast. Unlike the traditional HUD, because the luminous image generated would be more difficult to ascertain against a background of bright or direct sunlight.

BRIEF DESCRIPTION OF THE DRAWINGS

FIG. 4—Is a perspective view showing principals of liquid crystal display.

Figure 1:
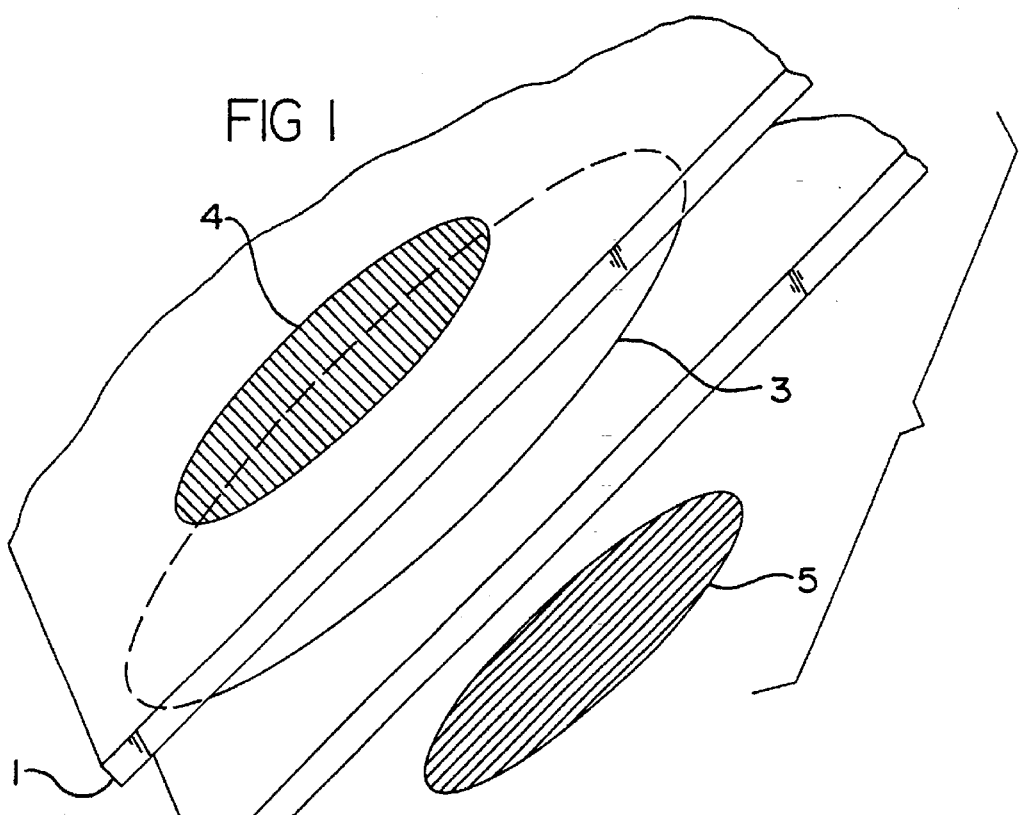
FIG. 1—Is a perspective view showing relationship between polarizers, sheets of glass, and disc-shaped thin film of liquid crystal.

DESCRIPTION OF PREFERRED
EMBODIMENT(S)

Referring to the drawings, a liquid crystal windshield display, according to the present invention, includes two pieces of congruent glass 1,2, a thin film of disc-shaped liquid crystal 3, two separate, disc-shaped sheets of polarized thin-film material 4,5, two sets of transparent electrodes 12,13,14, and a thin film, annular piece of clear plastic 7.

The two pieces of congruent glass 1,2 when placed together form a windshield of a vehicle such as an automotive vehicle. From now on I will refer to the pieces of glass as sheets of glass. I will call one sheet the outside sheet of glass 1 or (outside glass sheet) and the other sheet of glass as the inside sheet of glass 2 or (inside glass sheet). The following paragraph describes why those conventions were chosen.

When this twin-sheeted windshield is on any vehicle and a person was seated inside the vehicle and were to reach forward and touch the windshield, the person would touch the "inside" glass sheet. The other glass sheet, the one exposed to the outside environment, would be called the outside glass sheet.

I will also use the phrase, inner surface. What I am referring to is the surface of a glass sheet that is facing the other glass sheet. When I use the phrase outer surface, I am referring to the surface of a glass sheet that is facing away from the other glass sheet.

There are two sets of electrodes. Whenever I refer to an electrode or electrodes attached to the inner surface of the outside sheet of glass I will say front electrode or front electrodes. Whenever I refer to an electrode or electrodes attached to the inner surface of the inside sheet of glass I will say rear electrode or rear electrodes.

Figure 2:
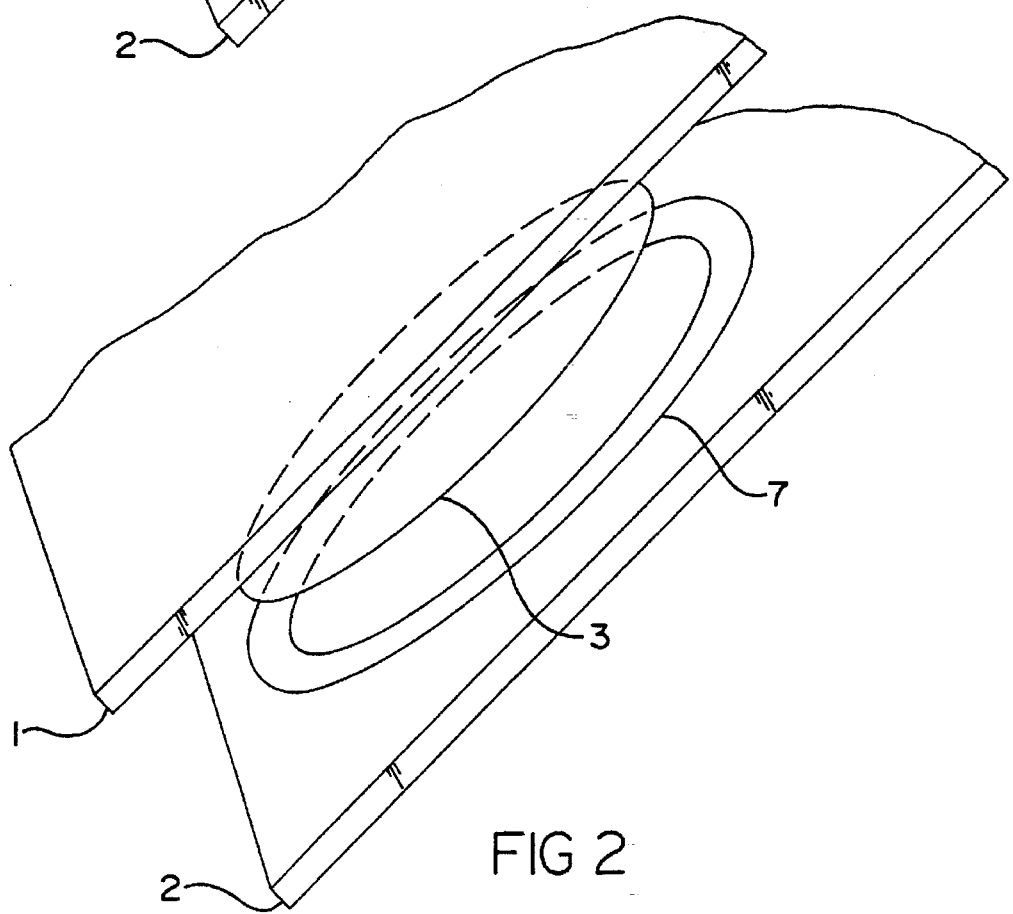
FIG. 2—Is a perspective view showing relationship between sheets of glass, disc-shaped film of liquid crystal, and annular ring of plastic.

When the two congruent sheets of glass 1,2 are placed together to form the windshield, sandwiched in between the sheets is a thin film of disc-shaped liquid crystal 3 surrounded by a thin-film, annular piece of clear plastic 7 as illustrated in FIG. 2 which shows an exploded view of this relationship. The sole purpose of the piece of clear plastic is to confine the film of liquid crystal so that it remains stationary. The diameter of liquid crystal 3 is approximately two (2) inches. This dimension, for purposes of discussion, is arbitrary, the diameter chosen can be larger or smaller. I have chosen it because I feel it is a reasonable size for the purposes at hand. The thickness of the film of liquid crystal is usually between five (5) and fifty (50) micrometers. The inner radius of clear plastic 7 is approximately two (2) inches which matches the diameter of liquid crystal 3. The outer radius of clear plastic 7 is approximately two and a half (2.5) inches. The general placement of the liquid crystal within the windshield will be specified later on.

There are two polarizers 4,5. Both polarizers are disc-shaped. Polarizer 4 is attached to the outer surface of the outside glass sheet 1 above the region of the liquid crystal. Polarizer 5 is attached on the opposite side on the outside surface of the inside glass sheet 2. (See FIG. 1). More specifically; imagine an imaginary point in the center of the disc-shaped liquid crystal 3. Then extend an imaginary perpendicular line from that point in both directions. Now where that imaginary line intersects the outside surfaces of both glass sheets 1,2 another point is formed. Both polarizers 4,5 are centered on these imaginary points on the outside surfaces of both glass sheets 1,2 so that the polarizers 4,5 lie directly above and below the disc-shaped liquid crystal 3. The diameters of both disc-shaped polarizers 4,5 are approximately one and half (1.5) inches. An important point to realize here is that the diameter of the polarizers 4,5 are smaller then the diameter of the disc-shaped liquid crystal 3, which in this case is approximately two (2) inches. The polarizing film would probably be transparent acrylic and the thickness would be approximately twenty-five (25) micrometers.

Both polarizers 4,5 have lines of polarization. The lines of 4,5 will be crossed with respect to each other. No matter what the orientation of one polarizer, the lines of polarization of the other must be shifted 90 degrees with respect to the other polarizer. This is done so that the liquid crystal can function as a twisted nematic liquid crystal display.

Figure 3:
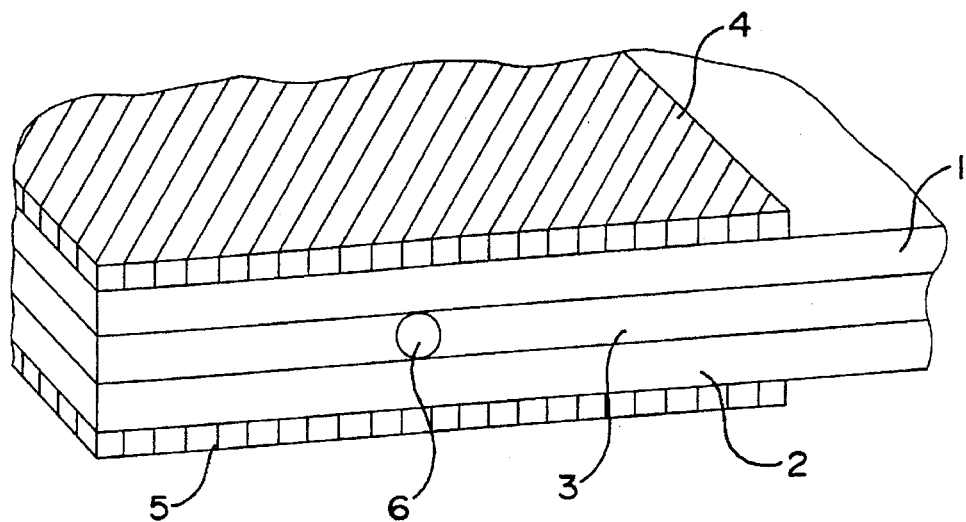
FIG. 3—Is a cross-sectional view showing relationship of polarizers, sheets of glass, liquid crystal, and thermoplastic beads.

Another important factor so that the liquid crystal can function as a liquid crystal display is the thickness of the liquid crystal. This is usually between five (5) and fifty (50) micrometers. To help maintain a uniform separation between the glass sheets, thermoplastic beads 6 will be inserted between the sheets of glass 1,2 in the liquid crystal 3 as illustrated in FIG. 3. Once immersed in the liquid crystal 3 the beads 6 become invisible to the eye. Thermoplastic beads are used because their dimensions are relatively invariant when subject to variations of temperature over a large range. In a vehicle this is important as vehicles are typically subject to a wide range of temperatures.

Two sets of transparent electrodes would be attached to the inner surfaces of the windshields. These electrodes are used to subject the liquid crystal to an electric field. The front electrodes are used to apply a positive charge and the rear electrode will act as ground. Although this convention is not necessary, it can be vice-versa. The transparent electrodes attached to the inner surfaces of the glass sheets run from the edge of the glass to an area indicated by the dotted line 16 in FIG. 5. At the edge of the windshield the electrodes are attached to driving electronics (not shown) that control which electrodes have a field applied to them. It should be appreciated that the driving electronics are conventional and known in the art. The transparent electrodes are typically a layer of tin oxide or indium oxide coated on the glass. The purpose of the electrodes are not only to apply an electric field to the liquid crystal but also the manner in which the regions of the electrodes are arranged geometrically fully determines what the LCD looks like. The driving electronics and the arrangement of the electrodes determine what information can be displayed by the LCD. A low voltage is applied to the liquid crystal, for purposes of illustration I will use five (5) volts.

Figure 5:
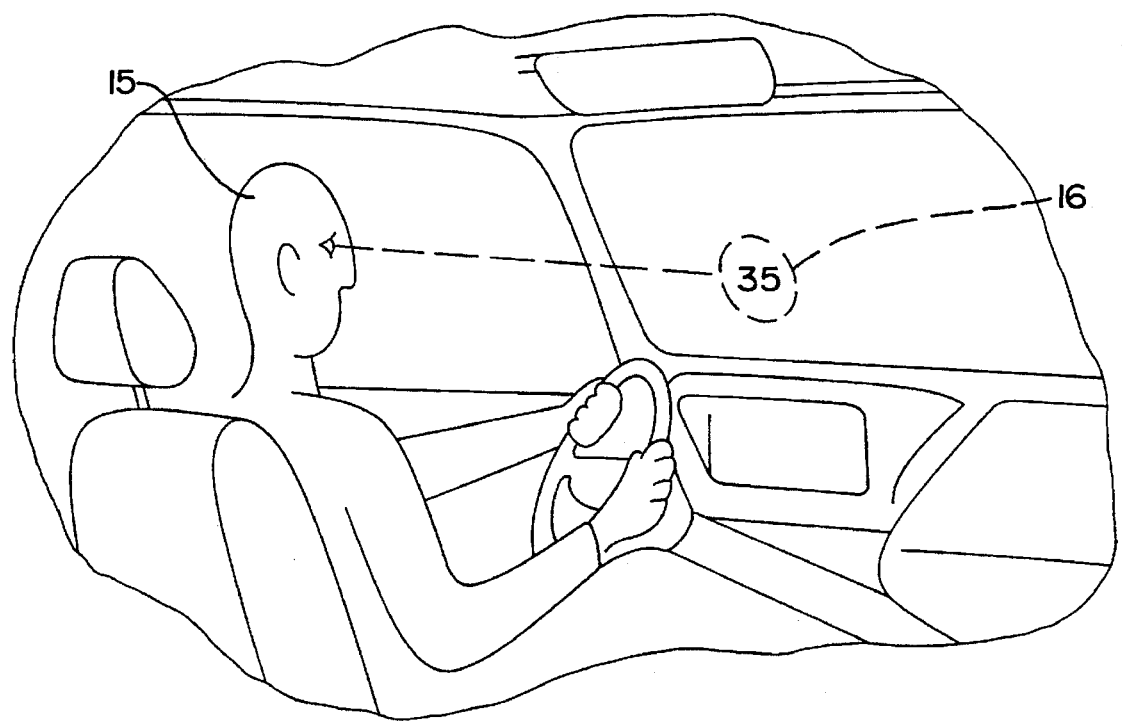
FIG. 5—Is a perspective view of a liquid crystal windshield display according to the present invention, illustrated in an operational relationship with an automotive vehicle.

The whole arrangement of liquid crystal and two polarizing films, lie in a region of the windshield (the windshield being constructed by the two sheets of glass 1,2) inside the circular dotted line in FIG. 5. The transparent electrodes terminate within the region of the dotted line and also the terminating regions of the electrodes sandwich the liquid crystal. When the driver 15 looks forward and the driver's gaze meets the windshield this forms an imaginary point. Which I have indicated by drawing a dotted line from point of view of driver to where drivers view would meet the windshield if said driver were looking forward and level. The region I have designated for the display to be, resides within the indicated dotted circular line. This region is somewhat to the right and somewhat lower than the point indicated where the driver's gaze meets the windshield. However this region is not so far to the right that it is in or near the center of the windshield. Again this is only an approximate location that cannot be exactly specified due to the fact that; a viewers height varies from person, heights of seats vary from vehicle to vehicle, vertical and horizontal dimensions of windshields vary, and slopes that windshields are set into vehicles vary.

Referring to FIG. 4, a cross-sectional view of the liquid crystal windshield display with three sample electrodes 12, 13, 14 is illustrated. Electrodes 12 13 are attached to the inner surface of the outside glass sheet. Electrode 14 is attached to the inner surface of the inside glass sheet. 12 will be referred to as the top front electrode, 13 the bottom front electrode and 15 as the rear electrode. Electrodes 12 13 will either have positive voltage applied or no voltage applied from a voltage source. The rear electrode will be attached to the ground or negative of the same voltage source.

I will now choose two light rays entering the liquid crystal windshield display from the outside 10 11. To begin with outside or exterior light is unpolarized. In other words the light rays 10 12 are vibrating in random planes. As light rays 10 11 pass through the outside polarizer 4 they both become polarized in the same plane. In this example, for purposes of clarity and illustration, I have chosen the outside polarizer to be horizontally aligned and the inside polarizer to be vertically aligned. However this is not necessary, all that is necessary is that the outside and inside polarizers be rotated ninety (90) degrees out of alignment with respect to each other. So 10 11 become polarized in the horizontal plane.

The rays then pass through the outside glass sheet 1. The rays pass through the front electrodes 12 13.

The front top electrode 12 has a voltage applied from the voltage source (not shown). The bottom electrode 13 has no voltage applied to it.

The light rays pass through the liquid crystal 3.

As ray 11 passes through the liquid crystal 3, the ray 11 twists itself ninety (90) degrees to a horizontal alignment.

As light ray 10 passes through the liquid crystal 3 it remains in its horizontal alignment. The reason for this is because the liquid crystal that ray 10 passes through has an electric field applied to it. This electric field causes the liquid crystal to align itself so that no twisting of light occurs as light passes through. The liquid crystal that ray 11 passes through has no electric field applied to it, because of this, light twists as it passes through the liquid crystal. So when an electric field is applied to the liquid crystal, the liquid crystal aligns itself in such a manner that light aligned in a specific plane does not twist as it passes through. And when no electric field is applied to the liquid crystal, light that is aligned in a specific plane twists as it passes through the liquid crystal.

So now light ray 10 is still aligned in a horizontal plane, and ray 11 is now aligned in a vertical plane, after passing through the liquid crystal 3.

The rays 10 11 pass through the rear electrode and the inside sheet of glass 2.

The rays 10 11 come to the inside polarizer 5. The inside polarizer 5 is vertically aligned. Since ray 11 is now vertically aligned it passes through the inside polarizer 5. However since ray 10 is still horizontally polarized it is blocked by the inside polarizer 5 and does not pass.

To a viewer situated in the path of the oncoming rays, the viewer would only see ray 11 and not ray 10.

So for a viewer observing the region of the two electrodes 12 13. The region of the top electrode 12 would be dark, because light would be passing through, and the region of the bottom electrode 13 would be clear. If both electrodes 12 13 had a voltage applied, both regions would be dark. If neither had a voltage applied then everything would be clear. If the bottom electrode 13 had a voltage applied, the region of the bottom electrode would be dark and the top would be clear. (An important point to understand is that the liquid crystal that is not between the electrodes will always remain clear due to the fact that there can be no applied electric field.)

So through this method, by strategically placing electrodes and applying voltages to the electrodes, any information can be supplied to the driver/viewer 15. These electrodes would be controlled through the use of electronic circuits. So for example by arranging the electrodes in a seven-segment manner that is found on most calculators one is able display any number from 0 to 9. By arranging two seven-segment sets of electrodes next to each other any number from 0 to 99 can be displayed. So then for example the current speed can be numerically expressed to the driver/viewer 15 any value from 0 to 99. An example is shown in FIG. 5 where the driver/viewer 15 sees the number 36 being displayed. Note the dotted line 16 would not be seen by the driver/viewer 15 only the number 36.

To sum up this is a windshield that is acting as an LCD in a see-through or transmission mode as opposed to the reflective mode that is currently being utilized in such LCD applications as calculator display.

An earlier point in the dimension of the polarizers and liquid crystal can now be better explained. I stated that the diameter of the liquid crystal is larger than the diameter of the polarizers. The reason for this is as follows.

If I had specified them both as having the same diameter it is possible that some light could have passed through both polarizers but not the liquid crystal, thus a slight curved line might appear. This is due to the fact that in manufacturing if both are specified as having the same diameter then it is possible that any imprecision in the manufacturing process could cause the diameter of the liquid crystal to be smaller than the polarizers at some point or points. So if the liquid crystal is specified as having a slightly larger diameter any light passing through the polarizers will always pass through the liquid crystal. The important point that I'd like to emphasize is that the diameter should be large enough to prevent light from going through both polarizers without going through the liquid crystal.

Also another important aspect is to realize is that anywhere front and back electrodes cross one another and have some liquid crystal between, it should be realized that there lies the potential of changing the alignment of the liquid crystal through an applied electric field. So care should be applied when arranging the electrodes to avoid unwanted changes in the liquid crystal, which would in turn translate to unwanted darkened regions.

An alternate method to the way I've described is a slight variation. Remove the annular piece of plastic, and have the liquid crystal throughout the entire windshield. Basically the thin film of liquid crystal would be the same dimensions as the windshield, the liquid crystal being sandwiched between the two glass sheets. Also the two cross-polarized sheets of film would cover the entire surface of the windshield. This way the transparent electrodes could be placed anywhere on the windshield thus allowing a greater flexibility in the design constraints involving the placement of the electrodes or multiple electrodes.

The above description shall not be construed as limiting the ways in which this invention may be practiced but shall be inclusive of many other variations that do not depart from the broad interest and intent of the invention.

What is claimed is:

1. A display for an automotive vehicle comprising:
   a first piece of glass;
   a second piece of glass congruent to and spaced apart from said first piece of glass to form an automotive windshield, said first piece of glass and said second piece of glass defining a space therebetween;
   a layer of liquid crystal having a first perimeter and disposed in said space to display information from the automotive windshield;
   a first polarizing element, having a second perimeter, disposed to overlap said layer of liquid crystal and secured to said first piece of glass;
   a second polarizing element, having a third perimeter, disposed to overlap said layer of liquid crystal and secured to said second piece of glass, wherein said second and third perimeters are within said first perimeter when viewed by the intended viewer of said display; and
   at least one bead in said space and extending between said first piece of glass and said second piece of glass to maintain said space therebetween.

2. A display as claimed in claim 1 further including at least one transparent electrode sandwiched between the first and the second polarizing elements.

3. A display as claimed in claim 1 further including:
   At least one transparent electrode disposed so that it is directly adjacent the layer of liquid crystal.

4. A display as claimed in claim 1 further including:
   Two sets of transparent electrodes directly adjacent to and on both sides of the layer of liquid crystal.

5. A display as claimed in claim 1 wherein said at least one bead is fabricated from a thermoplastic material.

6. A windshield assembly for an automotive vehicle comprising:
   a windshield;
   a layer of liquid crystal having a first perimeter and disposed within the windshield to display information from the windshield within a field of vision of a driver of the automotive vehicle;
   a first polarizing layer, having a second perimeter, disposed to overlap said layer of liquid crystal so that any polarized light passing through the layer of liquid crystal is due to the first polarizing layer;
   a second polarizing layer, having a third perimeter, disposed to overlap said layer of liquid crystal and spaced from the first polarizing layer, the liquid crystal being sandwiched between the first and second polarizing layers, wherein said second and third perimeters are within said first perimeter when viewed by the intended viewer;
   at least one transparent electrode sandwiched between the first polarizing layer and the second polarizing layer; and
   electronics to apply an emf to the liquid crystal via the at least one transparent electrode.

7. A windshield assembly in an automotive vehicle comprising:
   a windshield;
   a layer of liquid crystal having a first perimeter and disposed within the windshield to display information from the windshield within a field of vision of a driver of the automotive vehicle;
   a first polarizing layer, having a second perimeter, disposed to overlap said layer of liquid crystal so that any polarized light passing through the layer of liquid crystal is due to the first polarizing layer;
   a second polarizing layer, having a third perimeter, disposed to overlap said layer of liquid crystal and spaced from the first polarizing layer, the liquid crystal being sandwiched between the first and second polarizing layers, wherein said second and third perimeters are within said first perimeter when viewed by the intended viewer;
   the second polarizing layer rotated ninety (90) degrees out of alignment with the first polarizing layer; and
   at least one transparent electrode sandwiched between the first polarizing layer and the second polarizing layer.

8. A display for an automotive vehicle comprising:
   a first piece of glass;
   a second piece of glass congruent to and spaced apart from said first piece of glass to form an automotive windshield, said first piece of glass and said second piece of glass defining a space therebetween;
   a layer of liquid crystal having a first perimeter and disposed in said space to display information from the automotive windshield;

a first polarizing element, having a second perimeter, disposed to overlap said layer of liquid crystal and secured to said first piece of glass; and a second polarizing element, having a third perimeter disposed to overlap said layer of liquid crystal and secured to said second piece of glass, wherein said second and third perimeters are within said first perimeter when viewed by the intended viewer of said display.

9. A windshield assembly for an automotive vehicle comprising:

a windshield;

a layer of liquid crystal having a first perimeter and disposed within the windshield to display information from the windshield within a field of vision of a driver of the automotive vehicle;

a first polarizing layer, having a second perimeter, disposed to overlap said layer of liquid crystal so that any polarized light passing through the layer of liquid crystal is due to the first polarizing layer;

a second polarizing layer, having a third perimeter, disposed to overlap said layer of liquid crystal and spaced from the first polarizing layer, the liquid crystal being sandwiched between the first and second polarizing layers, wherein said second and third perimeters are within said first perimeter when viewed by the intended viewer.

* * * * *

UNITED STATES PATENT AND TRADEMARK OFFICE
CERTIFICATE OF CORRECTION

PATENT NO. : 5,638,202
DATED : June 10, 1997
INVENTOR(S) : Michael E. Rofe

It is certified that error appears in the above-indentified patent and that said Letters Patent is hereby corrected as shown below:

Column 6, line 40, after "because" insert --no--.

Column 6, line 65, "transmission" should be --transmissive--.

Signed and Sealed this

Fourteenth Day of October, 1997

Attest:

BRUCE LEHMAN

*Attesting Officer*          *Commissioner of Patents and Trademarks*